United States Patent [19]
Satoh

[11] Patent Number: 5,209,441
[45] Date of Patent: May 11, 1993

[54] CLAMP FOR ROD-LIKE ARTICLES
[75] Inventor: Tomoaki Satoh, Utsunomiya, Japan
[73] Assignee: NIFCO, Inc., Yokohama, Japan
[21] Appl. No.: 842,959
[22] Filed: Feb. 28, 1992
[30] Foreign Application Priority Data
  Mar. 1, 1991 [JP] Japan .................... 3-16996[U]
[51] Int. Cl.$^5$ ............................................ F16L 3/08
[52] U.S. Cl. .................... 248/74.2; 174/135;
                                248/71; 248/68.1
[58] Field of Search ............ 248/74.2, 71, 73, 70,
    248/68.1; 174/135, 72 R, 164, 40 CC, 40 R, 40 TD

[56] References Cited
U.S. PATENT DOCUMENTS

| | | | |
|---|---|---|---|
| 1,798,777 | 3/1931 | Anderson | 174/40 TD |
| 3,090,826 | 5/1963 | Cochran | 248/68.1 X |
| 3,897,895 | 8/1975 | Read | 248/316.1 X |
| 3,916,089 | 10/1975 | Sloan | 174/16 X |
| 4,049,905 | 9/1977 | Maranell | 174/163 F |
| 4,077,611 | 3/1978 | Wilson | 174/163 F X |
| 4,346,501 | 8/1982 | Saiya | 174/135 X |
| 4,609,170 | 9/1986 | Schnabl | 174/164 X |
| 4,609,171 | 9/1986 | Matsui | 248/74.2 X |
| 4,705,244 | 11/1987 | Saotome et al. | 248/74.2 X |
| 4,840,345 | 6/1989 | Neil et al. | 248/74.2 |

FOREIGN PATENT DOCUMENTS 941104  4/1956  Fed. Rep. of Germany ..... 248/74.2

OTHER PUBLICATIONS

"Tape Cable Clip." IBM Technical Disclosure Bulletin vol. 20 No. 12 (May 1978).
"Tape Cable Clip" IBM Technical Disclosure Bulletin vol. 20 No. 5 (Oct. 1977).

Primary Examiner—Ramon O. Ramirez
Assistant Examiner—Korie H. Chan
Attorney, Agent, or Firm—Schwartz & Weinrieb

[57] ABSTRACT

A clamp for rod-like articles includes a clamp plate having clamp bodies on its upper surface, a fastening plate having an anchor on its bottom surface, and a hinge connecting the two plates in parallel at a prescribed separation. In use, the fastening plate is bent about the hinge and locked to the clamp plate at an angle.

12 Claims, 4 Drawing Sheets

CLAMP FOR ROD-LIKE ARTICLES

BACKGROUND OF THE INVENTION

1. Field of the Invention

This invention relates to a clamp for supporting rod-like articles such as pipes, electric cords, power cables, or wires for various purposes, and more particularly to a clamp for supporting rod-like articles at an angle to a fitting section.

2. Description of the Prior Art

Conventional clamps for supporting rod-like articles such as pipes, cables or wires, consist of clamp bodies for accommodating and retaining the rod-like articles therein and a fastening plate for fastening the clamp to a fitting section. The clamp is monolithically formed by injection molding from thermoplastic synthetic resin, a material selected because it does not rust, is cheap and has high elasticity. (Refer to, for instance, Japanese Utility Model Public Disclosure No. 59-10581 or Japanese Utility Model Public Disclosure No. 63-110709.)

However, the conventional clamps described above are used for supporting rod-like articles in parallel with the fitting section, especially in restricted spaces, and are not suitable for supporting rod-like articles at an angle to a fitting section in such places as a vehicle engine compartment where they would be exposed to heat and vibration.

There has been a problem in the prior art that when a clamp used to support rod-like articles at an angle to a fitting section is produced by injection molding, the molded clamp cannot be removed from the die, and for this reason, the clamp bodies and the fastening plate are molded independently and then assembled.

In the conventional clamps described above, the clamp bodies and the fastening plate have been molded independently by means of injection molding, and the production cost, already including the die cost, molding cost and control cost, is made still higher by the need for an assembly process.

OBJECT OF THE INVENTION

An object of this invention is to provide a clamp which can be molded in one shot using a split die and can be used for supporting rod-like articles at an angle to a fitting section.

SUMMARY OF THE INVENTION

To achieve the above object, the clamp according to this invention comprises a clamp plate having at least one clamp body for accommodating a rod-like article on its upper surface, a fastening plate having an anchor on its bottom surface, a hinge connecting the clamp plate and the fastening plate in parallel at a prescribed distance from each other, at least one catch provided on the upper surface of the fastening plate and at least one hooking member provided on the bottom surface of the clamp plate.

In use, the fastening plate and the clamp plate are rotated about the hinge to bring the catch(es) and hook(s) into engagement with the two plates inclined with respect to each other. The anchor is then inserted into a hole in a fitting section and the rod-like article(s) is/are inserted into the clamp body or bodies so as to be retained at an angle to the surface of the fitting section. When the aforesaid clamp is formed by injection molding, the hinge is extended and the clamp plate and the fastening plate are kept at right angles, thus enabling the clamp to be molded using a split die.

BRIEF DESCRIPTION OF THE DRAWINGS

The above and other objects and features of this invention will become more apparent to those skilled in the art as the disclosure of the invention is made herein below with reference to the accompanying drawings, in which like reference characters designate like or corresponding parts throughout the several views, and wherein.

DESCRIPTION OF THE PREFERRED EMBODIMENT

Figure 1:
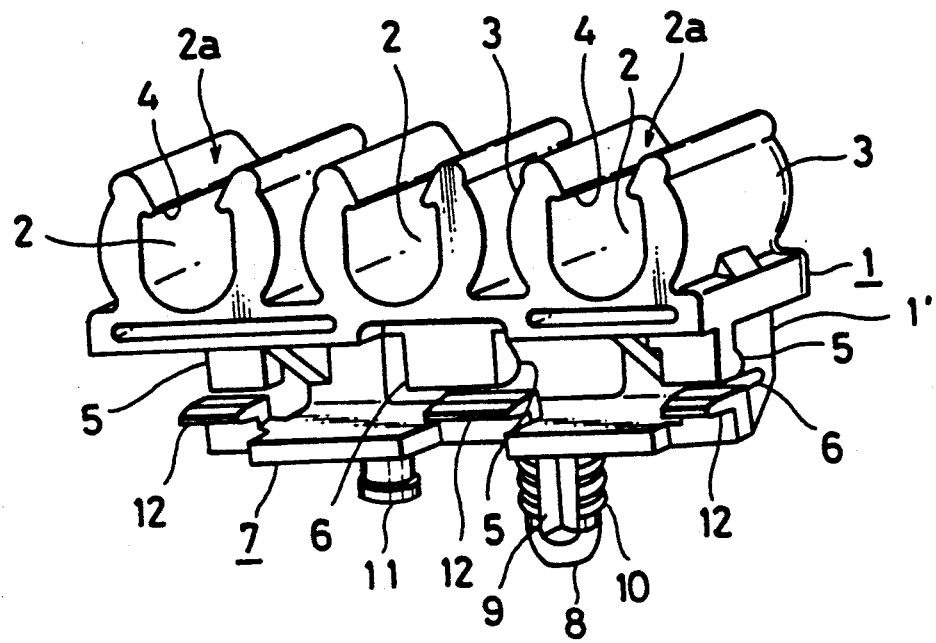
FIG. 1 is a perspective view of an embodiment of a clamp according to this invention.
Figure 2:
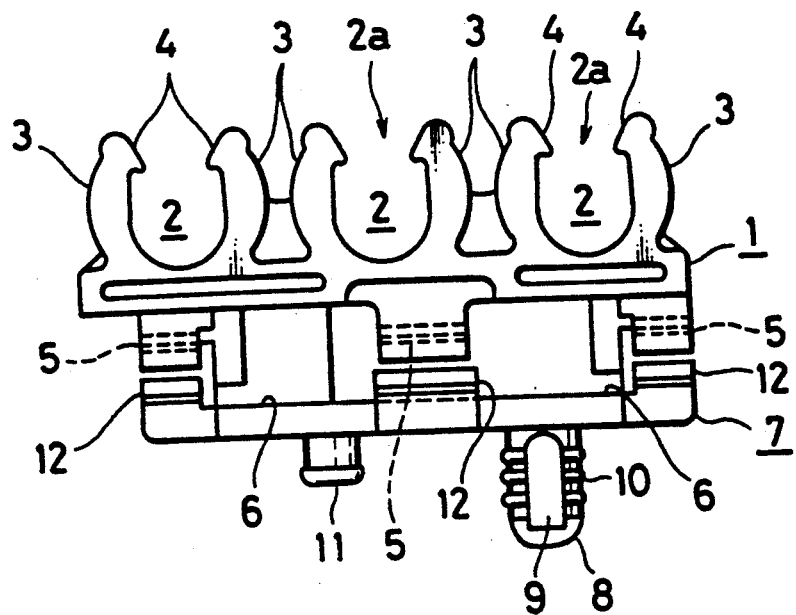
FIG. 2 is a front view of the clamp in FIG. 1.
Figure 3:
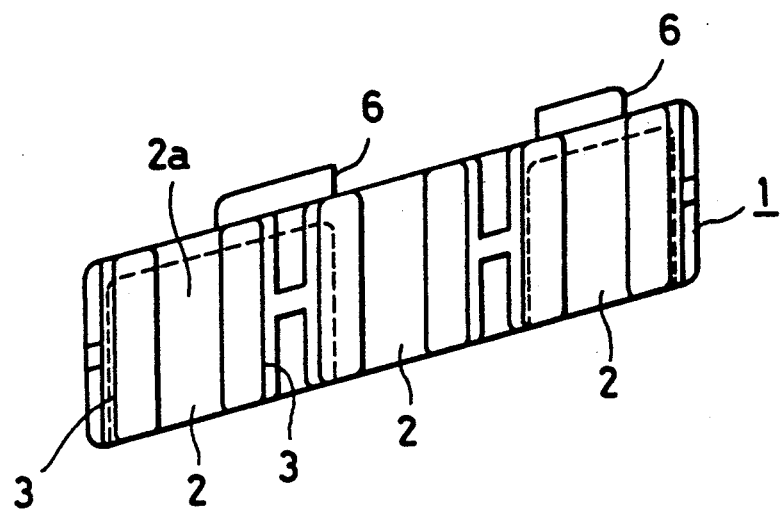
FIG. 3 is a plan view of the clamp in FIG. 1.
Figure 4:
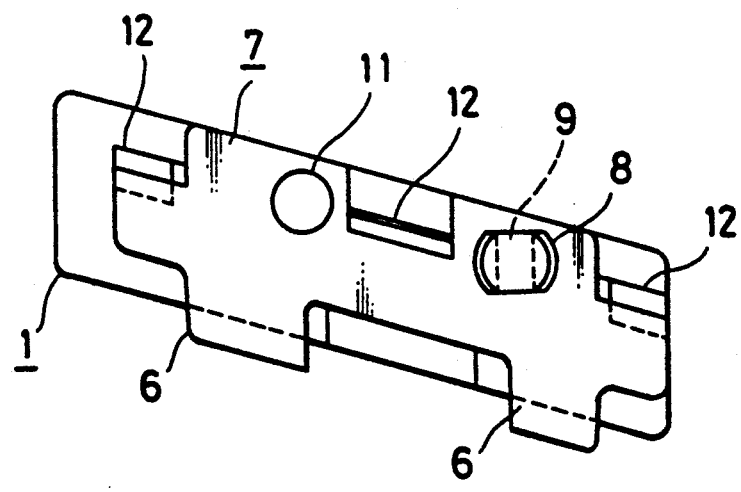
FIG. 4 is a bottom view of the clamp in FIG. 1.
Figure 5:
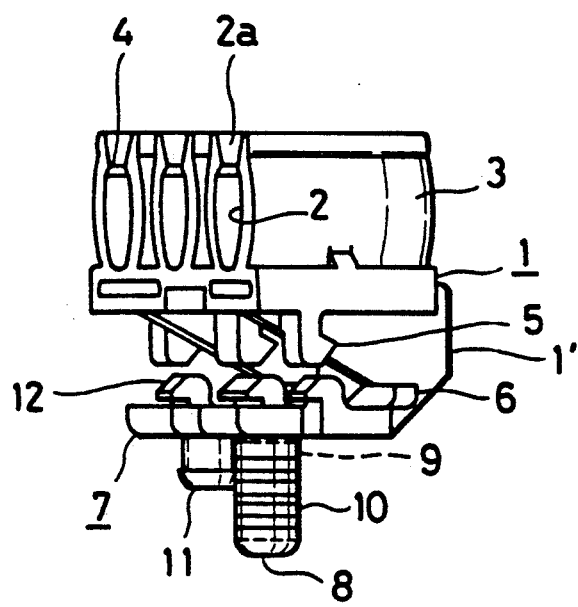
FIG. 5 is a side view of the clamp in FIG. 1.
Figure 6:
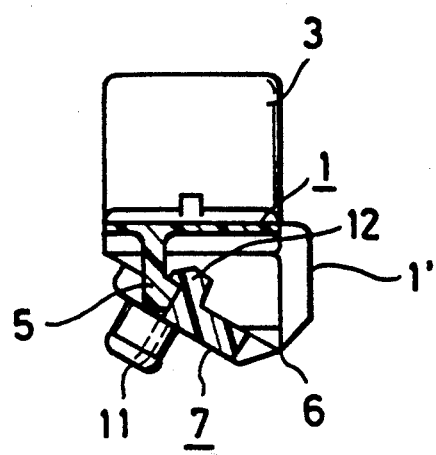
FIG. 6 is a cross-sectional view of the clamp in FIG. 1 with hooking members and catches engaged.
Figure 7:
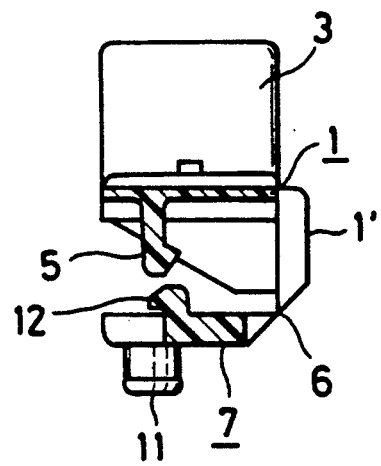
FIG. 7 is a cross-sectional view of the clamp of FIG. 6 with the hooking members and the catches disengaged.
Figure 8:
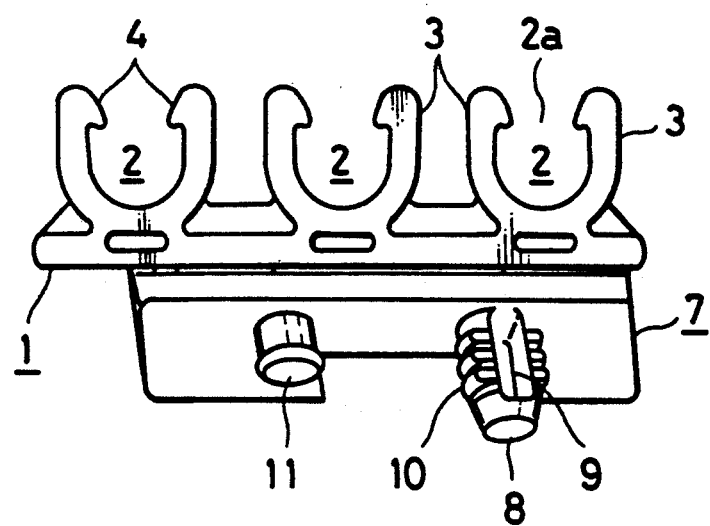
FIG. 8 is a perspective view of the clamp according to the invention with the hooking members and the catches disengaged.

The drawings show an embodiment of a clamp for rod-like articles according to this invention. The clamp comprises a clamp plate 1 having clamp bodies 2 on its upper surface, a fastening plate 7 having an anchor 8, and a hinge 6 elastically connecting edge portions of the plates 1 and 7. All members are monolithically formed by injection molding from thermoplastic synthetic resin.

The clamp plate 1 is flat and approximately rectangular and has the clamp bodies 2 (three in this embodiment) arranged in a row in its width direction on its upper surface. Each clamp body 2 is defined by the clamp plate 1 and a pair of side walls 3 standing upward from said clamp plate 1, and has an opening 2a for insertion of a rod-like article. Near the tip of each side wall 3 is formed a claw 4 which protrudes into the clamp body 2.

A wall member 1' extends downward from the longitudinal edge at the lower surface of the clamp plate 1. In addition, hooking members 5 are provided at three places on the opposite edge of the lower surface of the clamp plate 1.

One edge of the fastening plate 7 is connected via the hinge 6 to the lower edge of the wall member 1' of the clamp plate 1 so as to lie parallel with the clamp plate 1 at a distance therefrom. The anchor 8 and a projection 11 are provided on the bottom surface of the fastening plate 7 as spaced from each other in the width direction. The anchor 8 is cylindrical and has a window 9 at the center and a plurality of ribs 10 on its outer periphery.

On the upper surface of the fastening plate 7 are provided three catches 12 at positions where they will be hooked by the hooking members 5 provided on the lower surface of the clamp plate 1 when the hinge 6 is bent.

When the clamp according to this invention having the aforesaid configuration is molded using molten resin, the hinge 6 is extended so that the wall member 1' and the fastening plate 7 are on the same plane and are kept at right angles to the clamp plate 1, so that the clamp can easily be molded using a split die.

When using the clamp for a rod-like article having the configuration as described above, the fastening plate 7, which is parallel to the wall member 1', is bent via the hinge 6 so that each of the catches 12 on its upper surface engages with one of the hooking members on the lower surface of the clamp plate 1, thereby locking the two plates to each other at an angle to each other.

The two plates can be locked by application of a relatively weak force because of the elasticity of the material, and can be unlocked without breaking the plates by moving them with a relatively strong force in the direction opposite to the locking direction.

Then, the anchor 8 is pushed into a fitting hole of a fitting section (not shown). The diameter of the fitting hole is made slightly smaller than the outer diameter of the anchor 8 so that as it progresses the anchor 8 bends inward owing to its window 9 and the plurality of ribs 10 hook on the edge of the hole to prevent the anchor from detachment. A hole is also provided in the fitting section at a position corresponding to the projection 11 of the fastening plate and the projection 11 goes into the hole at the same time that anchor 8 enters its hole. The clamp is thus prevented from rotating.

When the clamp is fastened to the fitting section, the clamp plate 1 is held at an inclination to the surface of the fitting section, and the inclination is maintained when rod-like articles such as pipes, cables, or wires are inserted into the clamp bodies 2.

Since the insertion opening 2a of each clamp body 2 is narrowed by the claws 4, when a rod-like article is inserted, the side walls 3 bend outward because of the elasticity of the material, and when the rod-like article has cleared the claws 4, the side walls 3 restore to their original positions because of their elasticity. Thus once the rod-like articles have been inserted they will not fall out.

As the clamp according to this invention has the configuration described above, it can be injection molded of thermoplastic synthetic resin using a split die to obtain a clamp for supporting rod-like articles at an angle to a fitting section. The invention therefore enables the production of clamps requiring no assembly at low cost.

Obviously, many modifications and variations of the present invention are possible in light of the above teachings. It is therefore to be understood that within the scope of the appended claims, the present invention may be practiced otherwise than as specifically described herein.

What is claimed is:

1. A clamp for rod-like articles to be mounted upon a support means, comprising:
    a substantially planar clamp plate disposed within a first plane and having at least one clamp body for housing a rod-like article, said clamp body extending away from a first surface of said planar clamp plate, and said clamp plate having first and second edge portions;
    a substantially planar fastening plate disposed within a second plane inclined at a predetermined angle with respect to said first plane of said clamp plate and having anchor means for insertion within said support means so as to secure said clamp within said support means, said anchor means extending away from a first surface of said planar fastening plate, and said fastening plate having first and second edge portions;
    means for fixedly interconnecting said first edge portions of said clamp plate and said fastening plate so as to dispose said first edge portions of said two plates at a predetermined distance with respect to each other; and
    first means provided upon a second surface of said clamp plate and at said second edge portion thereof, sand second means provided upon a second surface of said fastening plate and at said second edge portion thereof, for interlocking said planar clamp plate and said planar fastening plate together such that said fastening plate is disposed at said predetermined angle with respect to said clamp plate.

2. A clamp according to claim 1, wherein said interlocking means includes a hooking member provided on the second surface of said clamp plate and a catch provided on the second surface of said fastening plate.

3. A clap as set forth in claim 1, wherein:
    said at least one clamp body comprises three clamp bodies having longitudinal axes which are disposed parallel to each other for housing at least three rod-like articles.

4. A clamp as set forth in claim 3, wherein:
    each of said clamp bodies has a substantially U-shaped configuration as seen in transverse cross-section with respect to said longitudinal axes thereof.

5. A clamp as set forth in claim 4, wherein:
    each of said clamp bodies comprises a pair of upstanding sidewalls extending away from said clamp plate, an opening defined between distal ends of said sidewalls for insertion and removal of said rod-like articles, and claw means provided upon said distal ends of said sidewalls for engaging said rod-like articles when disposed within said clamp bodies for retaining said rod-like articles within said clamp bodies.

6. A clamp as set forth in claim 3, wherein:
    said means for interlocking comprises a plurality of hook members provided upon said clamp plate and a plurality of catch members provided upon said fastening plate for interengaging each other, said hook and catch members being disposed in transversely spaced arrays with respect to said longitudinal axes of said rod-like articles.

7. A clamp for rod-like articles to be mounted upon a support means, comprising:
    a substantially planar clamp plate disposed within a first plane and having at least one clamp body for housing a rod-like article, said clamp body extending away form a first surface of said planar clamp plate, and said clamp plate having first and second edge portions;
    a substantially planar fastening plate disposed within a second plane and having anchor means for insertion within said support means so as to secure said clamp within said support means, said anchor means extending away from a first surface of said planar fastening plate, and said fastening plate having first and second edge portions;
    means for hingedly interconnecting said first edge portions of said clamp plate and said fastening plate such that said fastening plate is movable with respect to said clamp plate between a first unlatched position and a second latched position at which said fastening plate is disposed at a predetermined angle with respect to said clamp plate; and first means provided upon a second surface of said clamp plate and at said second edge portion thereof, and second means provided upon a second surface of said fastening plate and at said second edge portion thereof, for latching said planar clamp plate and said planar fastening plate together such that said fastening plate is disposed at said predetermined angle with respect to said clamp plate.

8. A clamp as set forth in claim 7, wherein:

said first means for latching of said clamp plate comprises at least one hook member and said second means for latching of said fastening plate comprises at least one catch member.

9. A clamp as set forth in claim 8, wherein:

said at least one hook member of said clamp plate and said at least one catch member of said fastening plate comprises three transversely spaced hook members and three transversely spaced catch members as considered in connection with longitudinally extending axes of said rod-like articles disposed within said clamp body of said clamp plate.

10. A clamp as set forth in claim 7, wherein:

said at least one clamp body comprises three transversely spaced clamp bodies as considered in connection with longitudinally extending axes of said rod-like articles disposed within said clamp bodies.

11. A clamp as set forth in claim 10, wherein:

each of said clamp bodies has a substantially U-shaped configuration as seen in transverse cross-section with respect to said longitudinally extending axes of said rod-like articles.

12. A clamp as set forth in claim 11, wherein:

each of said clamp bodies comprises a pair of upstanding sidewalls extending away from said clamp plate, an opening defined between distal end portions of said sidewalls for insertion and removal of said rod-like articles, and claw means provided upon said distal end portions of said sidewalls for engaging said rod-like articles when said rod-like articles are disposed within said clamp bodies so as to retain said rod-like articles within said clamp bodies.

* * * * *